(12) United States Patent
Pefkianakis et al.

(10) Patent No.: US 11,967,770 B2
(45) Date of Patent: Apr. 23, 2024

(54) ELECTRONIC DEVICES WITH POLARIZATION MANAGEMENT CAPABILITIES

(71) Applicant: Apple Inc., Cupertino, CA (US)

(72) Inventors: Ioannis Pefkianakis, San Jose, CA (US); Guillaume Monghal, San Diego, CA (US); Kshitij Joshi, San Diego, CA (US); Mohan Rao Thota, Milpitas, CA (US); Prashant H. Vashi, San Jose, CA (US); Zhenglian Cai, Cupertino, CA (US)

(*) Notice: Subject to any disclaimer, the term of this patent is extended or adjusted under 35 U.S.C. 154(b) by 194 days.

(21) Appl. No.: 17/581,738

(22) Filed: Jan. 21, 2022

(65) Prior Publication Data

US 2023/0268668 A1    Aug. 24, 2023

(51) Int. Cl.
| | |
|---|---|
| *H01Q 21/24* | (2006.01) |
| *H01Q 1/24* | (2006.01) |
| *H04B 7/06* | (2006.01) |
| *H04B 7/10* | (2017.01) |
| *H04B 17/327* | (2015.01) |

(52) U.S. Cl.
CPC ............. *H01Q 21/24* (2013.01); *H01Q 1/246* (2013.01); *H04B 7/0682* (2013.01); *H04B 7/10* (2013.01); *H04B 17/327* (2015.01)

(58) Field of Classification Search
CPC ............................... H01Q 21/24; H01Q 1/246
See application file for complete search history.

(56) References Cited

U.S. PATENT DOCUMENTS

| | | |
|---|---|---|
| 10,965,359 B2 | 3/2021 | Kim et al. |
| 11,026,137 B2 | 6/2021 | Koskela et al. |
| 11,026,235 B2 | 6/2021 | Raghavan et al. |

FOREIGN PATENT DOCUMENTS

WO    2021008495 A1    1/2021

*Primary Examiner* — Graham P Smith
(74) *Attorney, Agent, or Firm* — Treyz Law Group, P.C.; Michael H. Lyons

(57) ABSTRACT

An electronic device may include wireless circuitry with a phased antenna array that conveys radio-frequency signals using signal beams of first and second orthogonal polarizations. The array may sweep over a set of signal beam pairs, each including a respective combination of signal beams of the first and second polarizations. The wireless circuitry may gather performance metric values for each of the polarizations and signal beam pairs. The circuitry may generate a filtered set of signal beam pairs by removing signal beam pairs having performance metric values that differ from a maximum of the wireless performance metric values by more than a threshold. The circuitry may select a signal beam pair from the filtered set having a minimum polarization imbalance. The array may concurrently convey first and second wireless data streams using the selected signal beam pair. Minimizing polarization imbalance may maximize overall data throughput for the device.

20 Claims, 8 Drawing Sheets

CODEBOOK

| ANTENNA ELEMENT | BEAM$_V$ | | | |
|---|---|---|---|---|
| | $j=1$ | $j=2$ | $\cdots$ | $j=N1$ |
| 30-1 | $\Phi, \alpha$ | | | |
| 30-2 | | | | |
| $\vdots$ | | | | |
| 30-M | | | | |

| ANTENNA ELEMENT | BEAM$_H$ | | | |
|---|---|---|---|---|
| | $k=1$ | $k=2$ | $\cdots$ | $k=N2$ |
| 30-1 | $\Phi, \alpha$ | | | |
| 30-2 | | | | |
| $\vdots$ | | | | |
| 30-M | | | | |

*FIG. 4*

ELECTRONIC DEVICES WITH POLARIZATION MANAGEMENT CAPABILITIES

FIELD

This disclosure relates generally to electronic devices and, more particularly, to electronic devices with wireless circuitry.

BACKGROUND

Electronic devices are often provided with wireless capabilities. An electronic device with wireless capabilities has wireless circuitry that includes one or more antennas. The wireless circuitry is used to perform communications using radio-frequency signals conveyed by the antennas. In practice, it can be challenging to provide wireless circuitry that exhibits satisfactory wireless performance. For example, it can be challenging to provide wireless circuitry with satisfactory throughput.

SUMMARY

An electronic device may include wireless circuitry controlled by one or more processors. The wireless circuitry may include a phased antenna array that forms signal beams of radio-frequency signals. The phased antenna array may include antennas that convey radio-frequency signals using signal beams of first and second orthogonal polarizations. The phased antenna array may receive reference signals from a wireless base station using the first and second orthogonal polarizations. The phased antenna array may sweep over a set of signal beam pairs. Each signal beam pair may include a respective combination of signal beams of the first polarization and signal beams of the second polarization. One or more processors may gather wireless performance metric values for each of the polarizations and each of the signal beam pairs.

The one or more processors may generate a filtered set of signal beam pairs by filtering the set of signal beam pairs based on a threshold value. For example, the one or more processors may remove signal beam pairs having wireless performance metric values that differ from a maximum of the wireless performance metric values by more than the threshold value. The one or more processors may identify polarization imbalance values for each of the signal beam pairs in the filtered set of signal beam pairs. The one or more processors may select a signal beam pair from the filtered set of signal beam pairs having a minimum polarization imbalance to use for subsequent communications. The phased antenna array may then concurrently convey first and second wireless data streams using the selected signal beam pair. While the signal beams of the selected signal beam pair may not exhibit peak wireless performance metric values, minimizing polarization imbalance in this way may maximize overall data throughput for the device.

An aspect of the disclosure provides an electronic device. The electronic device may be configured to communicate with a wireless base station. The electronic device may include antennas configured to receive downlink signals from the wireless base station using a first polarization and a second polarization orthogonal to the first polarization. The electronic device may include one or more processors. The one or more processors may be configured to select a first signal beam of the first polarization and a second signal beam of the second polarization based on a polarization imbalance between the first polarization and the second polarization in the downlink signals received from the wireless base station. The one or more processors may be configured to use the antennas to convey a first stream of wireless data over the first signal beam while concurrently conveying a second stream of wireless data over the second signal beam.

An aspect of the disclosure provides a method of operating a user equipment device to communicate with a wireless base station. The method can include with one or more phased antenna arrays, receiving downlink signals from the wireless base station using a first polarization and using a second polarization orthogonal to the first polarization. The method can include selecting a first signal beam of the first polarization and a second signal beam of the second polarization based at least in part on a polarization imbalance between the first polarization and the second polarization in the received downlink signals. The method can include conveying a first stream of wireless data with the wireless base station over the first signal beam while concurrently conveying a second stream of wireless data with the wireless base station over the second signal beam.

An aspect of the disclosure provides a method of operating an electronic device to communicate with a wireless base station. The method can include with a phased antenna array, concurrently receiving downlink signals over a first signal beam of a first linear polarization and a second signal beam of a second linear polarization orthogonal to the first linear polarization. The method can include measuring a first wireless performance metric value from the downlink signals using the first signal beam and a second wireless performance metric value from the downlink signals using the second signal beam. The method can include with the phased antenna array, concurrently receiving the downlink signals over a third signal beam of the first linear polarization and a fourth signal beam of the second linear polarization, the third signal beam being oriented at a different angle than the first signal beam. The method can include measuring a third wireless performance metric value from the downlink signals using the third signal beam and a fourth wireless performance metric value from the downlink signals using the fourth signal beam. The method can include with the phased antenna array, concurrently conveying a first wireless data stream over the third signal beam and a second wireless data stream over the fourth signal beam, wherein the first wireless performance metric value differs from the second wireless performance metric value by a first amount, the third wireless performance metric value differs from the fourth wireless performance metric value by a second amount that is less than the first amount, and the first wireless performance metric value has a higher magnitude than the third wireless performance metric value and the fourth wireless performance metric value.

BRIEF DESCRIPTION OF THE DRAWINGS

FIG. 4 is a diagram of an illustrative codebook that includes phases and amplitudes for generating different vertically polarized signal beams and for generating different horizontally polarized signal beams in accordance with some embodiments.

DETAILED DESCRIPTION

Figure 1:
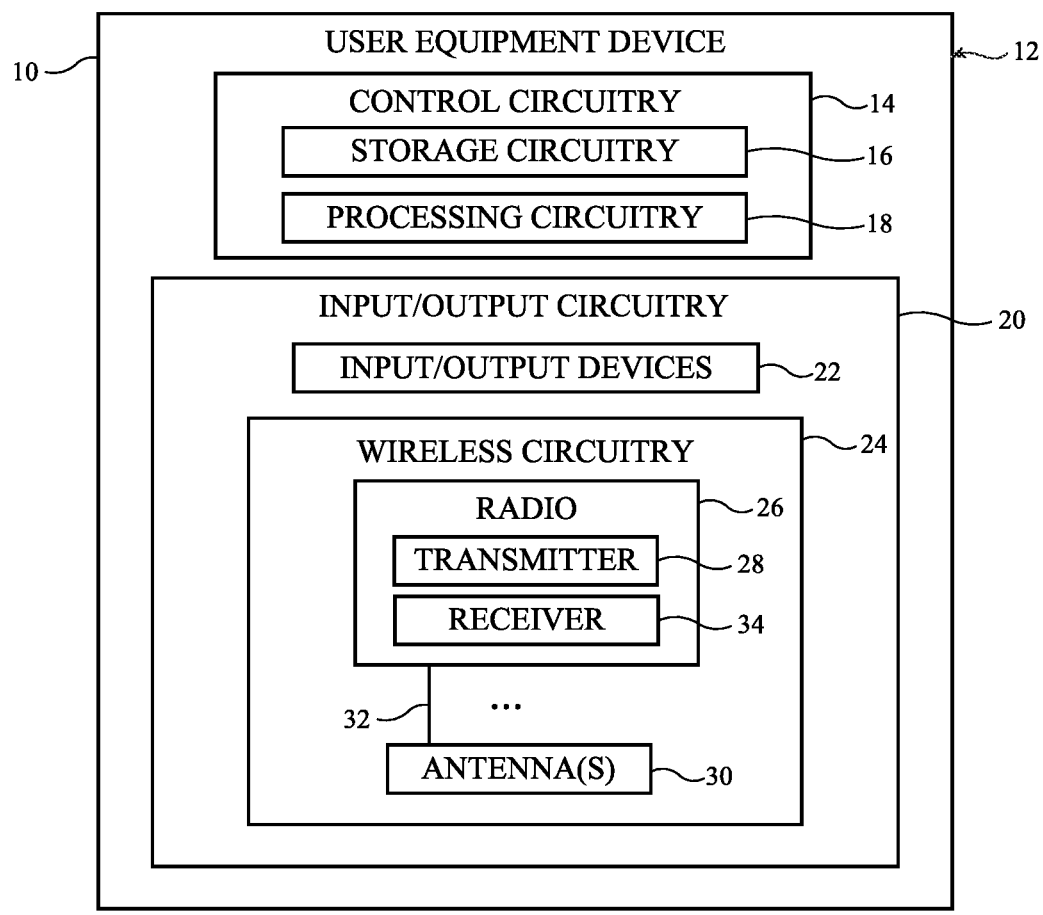
FIG. 1 is a functional block diagram of an illustrative user equipment device having wireless circuitry in accordance with some embodiments.

An electronic device such as user equipment (UE) device 10 of FIG. 1 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment. User equipment device 10 may sometimes be referred to herein as electronic device 10 or simply as device 10.

As shown in the functional block diagram of FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more processors, microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, etc.), antenna diversity protocols, satellite navigation system protocols (e.g., global positioning system (GPS) protocols, global navigation satellite system (GLONASS) protocols, etc.), antenna-based spatial ranging protocols, or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications. Wireless circuitry 24 (sometimes referred to herein as wireless communications circuitry 24) may include two or more antennas 30. Antennas 30 may be formed using any desired antenna structures for conveying radio-frequency signals. For example, antennas 30 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antennas 30 over time. If desired, two or more of antennas 30 may be integrated into a phased antenna array (sometimes referred to herein as a phased array antenna) in which each of the antennas conveys radio-frequency signals with a respective phase and magnitude that is adjusted over time so the radio-frequency signals constructively and destructively interfere to produce a signal beam in a given pointing direction.

The term "convey radio-frequency signals" as used herein means the transmission and/or reception of the radio-frequency signals (e.g., for performing unidirectional and/or bidirectional wireless communications with external wireless communications equipment). Antennas 30 may transmit the radio-frequency signals by radiating the radio-frequency signals into free space (or to free space through intervening device structures such as a dielectric cover layer). Antennas 30 may additionally or alternatively receive the radio-frequency signals from free space (e.g., through intervening devices structures such as a dielectric cover layer). The transmission and reception of radio-frequency signals by antennas 30 each involve the excitation or resonance of antenna currents on an antenna resonating element in the antenna by the radio-frequency signals within the frequency band(s) of operation of the antenna.

Wireless circuitry 24 may include one or more radios 26. Radio 26 may include circuitry that operates on signals at baseband frequencies (e.g., baseband circuitry) and radio-frequency transceiver circuitry such as one or more radio-frequency transmitters 28 and one or more radio-frequency receivers 34. Transmitter 28 may include signal generator circuitry, modulation circuitry, mixer circuitry for upconverting signals from baseband frequencies to intermediate frequencies and/or radio frequencies, amplifier circuitry such as one or more power amplifiers, digital-to-analog converter (DAC) circuitry, control paths, power supply paths, switching circuitry, filter circuitry, and/or any other circuitry for transmitting radio-frequency signals using antennas 30. Receiver 34 may include demodulation circuitry, mixer circuitry for downconverting signals from intermediate frequencies and/or radio frequencies to baseband frequencies, amplifier circuitry (e.g., one or more low-noise amplifiers (LNAs)), analog-to-digital converter (ADC) circuitry, control paths, power supply paths, signal paths, switching circuitry, filter circuitry, and/or any other circuitry for receiving radio-frequency signals using antennas 30. The components of radio 26 may be mounted onto a single substrate or integrated into a single integrated circuit, chip, package, or system-on-chip (SOC) or may be distributed between multiple substrates, integrated circuits, chips, packages, or SOCs.

Each radio 26 may be coupled to one or more antennas 30 over one or more radio-frequency transmission lines 32. Radio-frequency transmission lines 32 may include coaxial cables, microstrip transmission lines, stripline transmission lines, edge-coupled microstrip transmission lines, edge-coupled stripline transmission lines, transmission lines formed from combinations of transmission lines of these types, etc. Radio-frequency transmission lines 32 may be integrated into rigid and/or flexible printed circuit boards if desired. One or more radio-frequency tranmission lines 32 may be shared between multiple radios 26 if desired. Radio-frequency front end (RFFE) modules may be interposed on one or more radio-frequency transmission lines 32. The radio-frequency front end modules may include substrates, integrated circuits, chips, or packages that are separate from radios 26 and may include filter circuitry, switching circuitry, amplifier circuitry, impedance matching circuitry, radio-frequency coupler circuitry, and/or any other desired radio-frequency circuitry for operating on the radio-frequency signals conveyed over radio-frequency transmission lines 32.

Radio 26 may transmit and/or receive radio-frequency signals within corresponding frequency bands at radio frequencies (sometimes referred to herein as communications bands or simply as "bands"). The frequency bands handled by radio 26 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below GHz, 5G New Radio Frequency Range 2 (FR2) bands between 20 and 60 GHz, etc.), other centimeter or millimeter wave frequency bands between 10-300 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

The example of FIG. 1 is merely illustrative. While control circuitry 14 is shown separately from wireless circuitry 24 in the example of FIG. 1 for the sake of clarity, wireless circuitry 24 may include processing circuitry (e.g., one or more processors) that forms a part of processing circuitry 18 and/or storage circuitry that forms a part of storage circuitry 16 of control circuitry 14 (e.g., portions of control circuitry 14 may be implemented on wireless circuitry 24). As an example, control circuitry 14 may include baseband circuitry (e.g., one or more baseband processors), digital control circuitry, analog control circuitry, and/or other control circuitry that forms part of radio 26. The baseband circuitry may, for example, access a communication protocol stack on control circuitry 14 (e.g., storage circuitry 16) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC layer, and/or non-access stratum layer. If desired, the PHY layer operations may additionally or alternatively be performed by radio-frequency (RF) interface circuitry in wireless circuitry 24.

Figure 2:
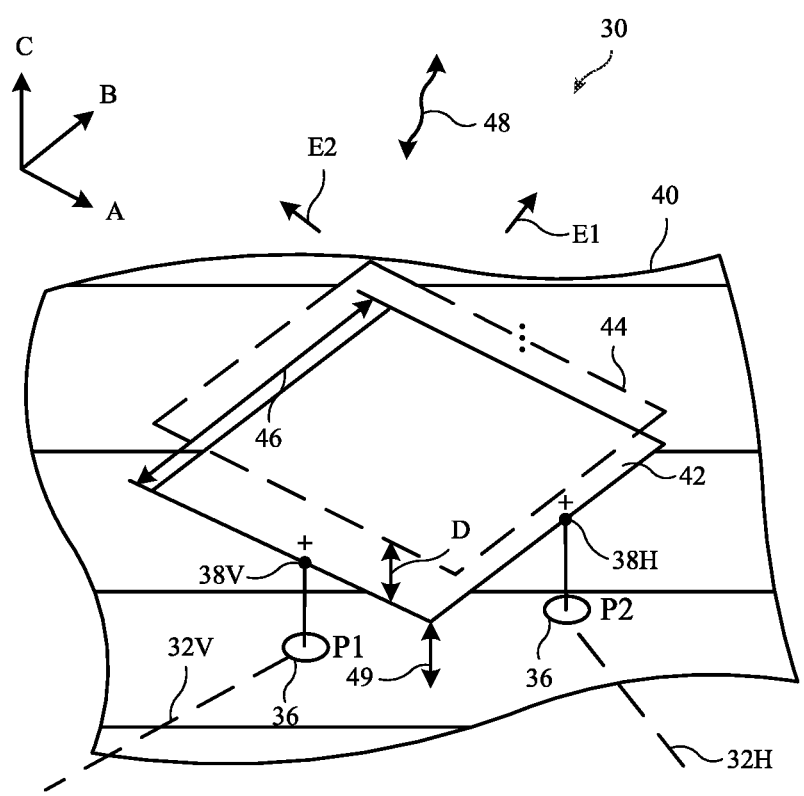
FIG. 2 is a perspective view of an illustrative antenna that may convey radio-frequency signals using horizontal and vertical polarizations in accordance with some embodiments.

Any desired antenna structures may be used to form antennas 30. If desired, antennas 30 may each have multiple antenna feeds that allow the antennas to support multiple polarizations. Each antenna 30 may, for example, have a first antenna feed coupled to a corresponding radio-frequency transmission line 32V for handling a first polarization and a second antenna feed coupled to a corresponding radio-frequency transmission line 32H for handling a second polarization. FIG. 2 is a perspective view showing one example in which an antenna 30 is formed using patch antenna structures for covering multiple polarizations.

As shown in FIG. 2, antenna 30 may have a patch antenna resonating element 42 that is separated from and parallel to a ground plane such as antenna ground 40. Patch antenna resonating element 42 may lie within a plane such as the A-B plane of FIG. 2 (e.g., the lateral surface area of element 42 may lie in the A-B plane). Patch antenna resonating element 42 may sometimes be referred to herein as patch 42, patch element 42, patch resonating element 42, antenna resonating element 42, or resonating element 42. Antenna ground 40 may lie within a plane that is parallel to the plane of patch element 42. Patch element 42 and antenna ground 40 may therefore lie in separate parallel planes that are separated by distance 49. Patch element 42 and antenna ground 40 may be formed from conductive traces patterned on a dielectric substrate such as a rigid or flexible printed circuit board substrate or any other desired conductive structures.

The length of the sides of patch element 42 may be selected so that antenna 30 resonates (radiates) at a desired operating frequency. For example, the sides of patch element 42 may each have a length 46 that is approximately equal to half of the wavelength of the signals conveyed by antenna 30 (e.g., the effective wavelength given the dielectric properties of the materials surrounding patch element 42). In one suitable arrangement, length 46 may be between 0.8 mm and 1.2 mm (e.g., approximately 1.1 mm) for covering a millimeter wave frequency band between 57 GHz and 70 GHz or between 1.6 mm and 2.2 mm (e.g., approximately 1.85 mm) for covering a millimeter wave frequency band between 37 GHz and 41 GHz, as just two examples.

The example of FIG. 2 is merely illustrative. Patch element 42 may have a square shape in which all of the sides of patch element 42 are the same length or may have a different rectangular shape. Patch element 42 may be formed in other shapes having any desired number of straight and/or curved edges.

To enhance the polarizations handled by antenna 30, antenna 30 may be provided with multiple antenna feeds. As shown in FIG. 2, antenna 30 may have a first antenna feed at antenna port P1 that is coupled to a corresponding radio-frequency transmission line 32V. Antenna 30 may have a second antenna feed at antenna port P2 that is coupled to a corresponding radio-frequency transmission line 32H. The first antenna feed may have a first ground feed terminal coupled to antenna ground 40 (not shown in FIG. 2 for the sake of clarity) and a first positive antenna feed terminal 38V coupled to patch element 42. The second antenna feed may have a second ground feed terminal coupled to antenna ground 40 (not shown in FIG. 2 for the sake of clarity) and a second positive antenna feed terminal 38H on patch element 42.

Holes or openings such as openings 36 may be formed in antenna ground 40. Radio-frequency transmission line 32V may include a vertical conductor (e.g., a conductive through-via, conductive pin, metal pillar, solder bump, combinations of these, and/or other vertical conductive interconnect structures) that extends through opening 36 to positive antenna feed terminal 38V on patch element 42. Radio-frequency transmission line 32H may include a vertical conductor that extends through opening 36 to positive antenna feed terminal 38H on patch element 42. This example is merely illustrative and, if desired, other transmission line structures may be used (e.g., coaxial cable structures, stripline transmission line structures, etc.).

When using the first antenna feed associated with port P1, antenna 30 may transmit and/or receive radio-frequency signals having a first polarization (e.g., the electric field E1 of radio-frequency signals 48 associated with port P1 may be oriented parallel to the B-axis in FIG. 2). When using the antenna feed associated with port P2, antenna 30 may transmit and/or receive radio-frequency signals having a second polarization (e.g., the electric field E2 of radio-frequency signals 48 associated with port P2 may be oriented parallel to the A-axis of FIG. 2 so that the polarizations associated with ports P1 and P2 are orthogonal to each other).

One of ports P1 and P2 may be used at a given time so that antenna 30 operates as a single-polarization antenna or both ports may be operated at the same time so antenna 30 operates as a dual-polarization antenna (e.g., where antenna 30 concurrently conveys horizontal and vertically polarized signals) or with other polarizations (e.g., as a circularly-polarized antenna, an elliptically-polarized antenna, etc.).

If desired, antenna 30 may include one or more additional patch elements 44 that are stacked over patch element 42. Each patch element 44 may partially or completely overlap patch element 42. The lower-most patch element 44 may be separated from patch element 42 by distance D, which is selected to provide antenna 30 with a desired bandwidth without occupying excessive volume within device 10. Patch elements 44 may have sides with lengths other than length 46, which configure patch elements 44 to radiate at different frequencies than patch element 42, thereby extending the overall bandwidth of antenna 30. Patch elements 44 may include directly-fed patch antenna resonating elements (e.g., patch elements with one or more positive antenna feed terminals directly coupled to transmission lines) and/or parasitic antenna resonating elements that are not directly fed by antenna feed terminals and transmission lines. The combined resonance of patch element 42 and each of patch elements 44 may configure antenna 30 to radiate with satisfactory antenna efficiency across the entirety of any desired frequency band.

The example of FIG. 2 is merely illustrative. Patch elements 44 may be omitted if desired. Patch elements 44 may be rectangular, square, cross-shaped, or any other desired shape having any desired number of straight and/or curved edges. Patch elements 44 may be provided at any desired orientation relative to patch element 42. Antenna 30 may have any desired number of feeds. Other antenna types may be used if desired (e.g., dipole antennas, monopole antennas, slot antennas, inverted-F antennas, planar inverted-F antennas, waveguide antennas, dielectric resonator antennas, etc.). If desired, device 10 may include different sets of antennas that each cover a respective polarization (e.g., a first set of antennas for covering the vertical polarization and a second set of antennas for covering the horizontal polarization).

As software applications on user equipment devices such as device 10 have become more data intensive, there has been increasing demand for devices that support wireless communications at high data rates. In general, higher frequencies support higher data rates. The antennas 30 in device 10 may therefore convey radio-frequency signals at relatively high frequencies such as frequencies greater than 10 GHz (e.g., in 5G NR FR2 bands). While these frequencies support high data rates, radio-frequency signals at these frequencies can be subject to substantial attenuation during propagation. To counteract this attenuation, two or more antennas 30 in device 10 may be arranged in one or more phased antenna arrays.

Figure 3:
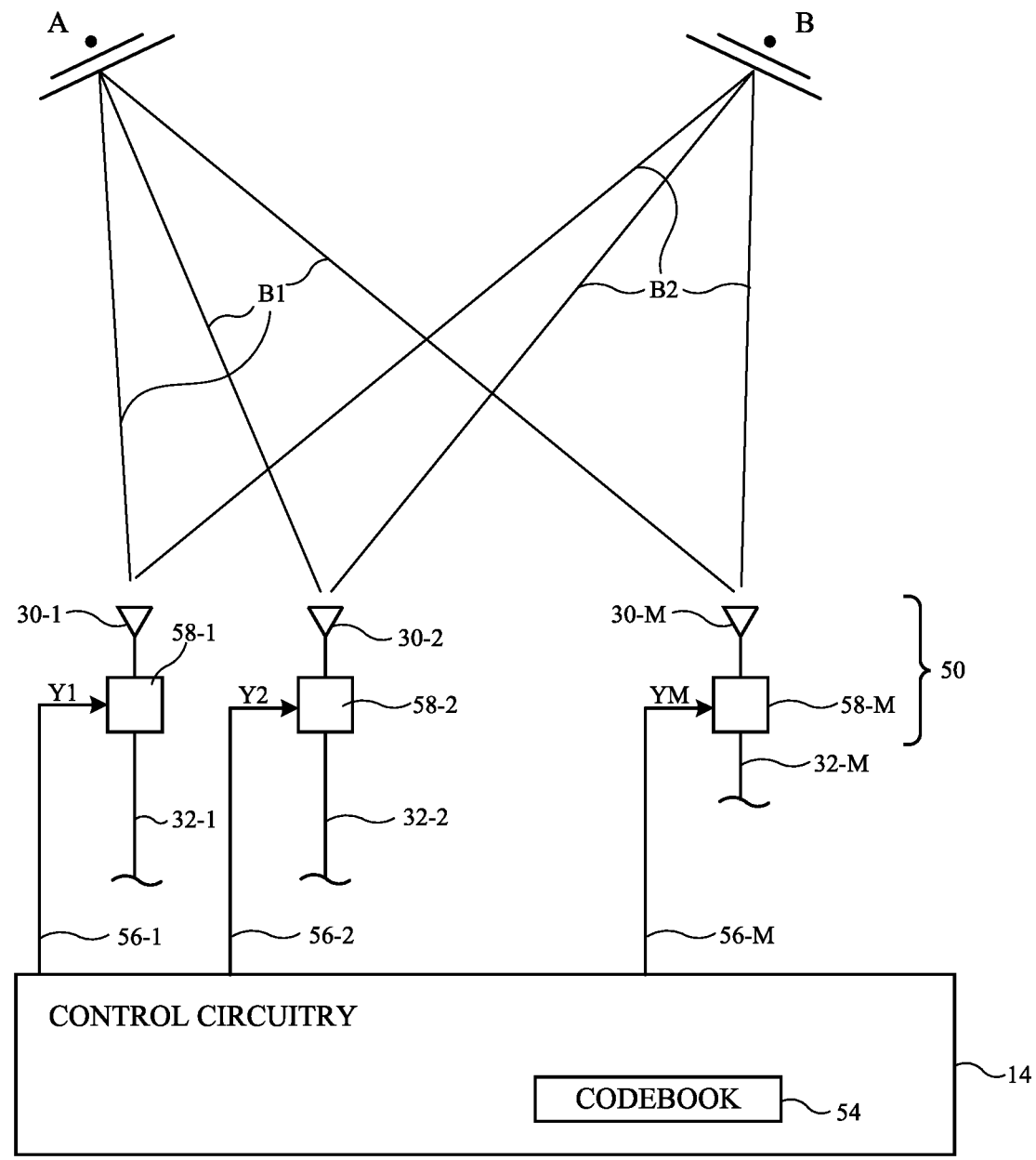
FIG. 3 is a diagram of an illustrative phased antenna array that may be controlled using a codebook to form different radio-frequency signal beams in accordance with some embodiments.

FIG. 3 is a diagram showing how antennas 30 may be arranged in a phased antenna array. As shown in FIG. 3, phased antenna array 50 (sometimes referred to herein as array 50, antenna array 50, or array 50 of antennas 30) may be coupled to radio-frequency transmission lines 32. For example, a first antenna 30-1 in phased antenna array 50 may be coupled to a first radio-frequency transmission line 32-1, a second antenna 30-2 in phased antenna array 50 may be coupled to a second radio-frequency transmission line 32-2, an Mth antenna 30-M in phased antenna array 50 may be coupled to an Mth radio-frequency transmission line 32-M, etc. While antennas 30 are described herein as forming a phased antenna array, the antennas 30 in phased antenna array 50 may sometimes also be referred to as collectively forming a single phased array antenna (e.g., where each antenna 30 in the phased array antenna forms an antenna element of the phased array antenna). Radio-frequency transmission lines 32 may each be coupled to one or more radios 26 (FIG. 1). Each radio-frequency transmission line 32 of FIG. 3 may include two radio-frequency transmission line paths for handling multiple polarizations (e.g., respective radio-frequency transmission lines 32H and 32V of FIG. 2 may be coupled to each of the antennas 30 in phased antenna array 50).

The antennas 30 in phased antenna array 50 may be arranged in any desired number of rows and columns or in any other desired pattern (e.g., the antennas need not be arranged in a grid pattern having rows and columns). During signal transmission operations, radio-frequency transmission lines 32 may be used to supply signals (e.g., radio-frequency signals such as millimeter wave and/or centimeter wave signals) from radio 26 (FIG. 1) to phased antenna array for wireless transmission. During signal reception operations, radio-frequency transmission lines 32 may be used to convey signals received at phased antenna array 50 to radio 26 (FIG. 1).

The use of multiple antennas 30 in phased antenna array 50 allows radio-frequency beam forming arrangements (sometimes referred to herein as radio-frequency beam steering arrangements) to be implemented by controlling the relative phases and magnitudes (amplitudes) of the radio-frequency signals conveyed by the antennas. In the example of FIG. 3, the antennas in phased antenna array 50 each have a corresponding radio-frequency phase and magnitude controller 58 (e.g., a first phase and magnitude controller 58-1 interposed on radio-frequency transmission line 32-1 may control phase and magnitude for radio-frequency signals handled by antenna 30-1, a second phase and magnitude controller 58-2 interposed on radio-frequency transmission line 32-2 may control phase and magnitude for radio-frequency signals handled by antenna 30-2, an Mth phase and magnitude controller 58-M interposed on radio-frequency transmission line 32-M may control phase and magnitude for radio-frequency signals handled by antenna 30-M, etc.).

Phase and magnitude controllers 58 may each include circuitry for adjusting the phase of the radio-frequency signals on radio-frequency transmission lines 32 (e.g., phase shifter circuits) and/or circuitry for adjusting the magnitude of the radio-frequency signals on radio-frequency transmission lines 32 (e.g., power amplifier and/or low noise amplifier circuits). Phase and magnitude controllers 58 may sometimes be referred to collectively herein as beam steering or beam forming circuitry (e.g., beam steering circuitry that steers the beam of radio-frequency signals transmitted and/or received by phased antenna array 50).

Phase and magnitude controllers 58 may adjust the relative phases and/or magnitudes of the transmitted signals that are provided to each of the antennas in phased antenna array 50 and may adjust the relative phases and/or magnitudes of the received signals that are received by phased antenna array 50. Phase and magnitude controllers 58 may, if desired, include phase detection circuitry for detecting the phases of the received signals that are received by phased antenna array 50. The term "beam," "signal beam," "radio-frequency beam," or "radio-frequency signal beam" may be used herein to collectively refer to wireless signals that are transmitted and received by phased antenna array 50 in a particular direction. The signal beam may exhibit a peak gain that is oriented in a particular beam pointing direction at a corresponding beam pointing angle (e.g., based on constructive and destructive interference from the combination of signals from each antenna in the phased antenna array). The term "transmit beam" may sometimes be used herein to refer to radio-frequency signals that are transmitted in a particular direction whereas the term "receive beam" may sometimes be used herein to refer to radio-frequency signals that are received from a particular direction.

If, for example, phase and magnitude controllers 58 are adjusted to produce a first set of phases and/or magnitudes for transmitted radio-frequency signals, the transmitted signals will form a transmit beam as shown by beam B1 of FIG. 3 that is oriented in the direction of point A. If, however, phase and magnitude controllers 58 are adjusted to produce a second set of phases and/or magnitudes for the transmitted signals, the transmitted signals will form a transmit beam as shown by beam B2 that is oriented in the direction of point B. Similarly, if phase and magnitude controllers 58 are adjusted to produce the first set of phases and/or magnitudes, radio-frequency signals (e.g., radio-frequency signals in a receive beam) may be received from the direction of point A, as shown by beam B1. If phase and magnitude controllers 58 are adjusted to produce the second set of phases and/or magnitudes, radio-frequency signals may be received from the direction of point B, as shown by beam B2.

Each phase and magnitude controller 58 may be controlled to produce a desired phase and/or magnitude based on a corresponding control signal Y received from control circuitry 14 over control paths 56 (e.g., the phase and/or magnitude provided by phase and magnitude controller 58-1 may be controlled using control signal Y1 on control path 56-1, the phase and/or magnitude provided by phase and magnitude controller 58-2 may be controlled using control signal Y2 on control path 56-2, the phase and/or magnitude provided by phase and magnitude controller 58-M may be controlled using control signal YM on control path 56-M, etc.). If desired, control circuitry 14 may actively adjust control signals Y in real time to steer the transmit or receive beam in different desired directions (e.g., to different desired beam pointing angles) over time. Phase and magnitude controllers 58 may provide information identifying the phase of received signals to control circuitry 14 if desired.

When performing wireless communications using radio-frequency signals at millimeter and centimeter wave frequencies, the radio-frequency signals are conveyed over a line-of-sight path between phased antenna array 50 and external wireless equipment (e.g., a wireless base station). If the external wireless equipment is located at point A of FIG. 3, phase and magnitude controllers 58 may be adjusted to steer the signal beam towards point A (e.g., to form a signal beam having a beam pointing angle directed towards point A). Phased antenna array 50 may then transmit and receive radio-frequency signals in the direction of point A. Similarly, if the external wireless equipment is located at point B, phase and magnitude controllers 58 may be adjusted to steer the signal beam towards point B (e.g., to form a signal beam having a beam pointing angle directed towards point B). Phased antenna array 50 may then transmit and receive radio-frequency signals in the direction of point B. In the example of FIG. 3, beam steering is shown as being performed over a single degree of freedom for the sake of simplicity (e.g., towards the left and right on the page of FIG. 3). However, in practice, the beam may be steered over two or more degrees of freedom (e.g., in three dimensions, into and out of the page and to the left and right on the page of FIG. 3). Phased antenna array 50 may have a corresponding field of view over which beam steering can be performed (e.g., in a hemisphere or a segment of a hemisphere over the phased antenna array). If desired, device 10 may include multiple phased antenna arrays that each face a different direction to provide coverage from multiple sides of the device.

Control circuitry 14 may identify a desired beam pointing angle for the signal beam of phased antenna array 50 and may adjust the control signals Y provided to phased antenna array 50 to configure phased antenna array 50 to form (steer) the signal beam at that beam pointing angle. Each possible beam pointing angle that can be used by phased antenna array 50 during wireless communications may be identified by a beam steering codebook such as codebook 54. Codebook 54 may be stored at control circuitry 14, elsewhere on device 10, or may be located (offloaded) on external equipment and conveyed to device 10 over a wired or wireless communications link.

Codebook 54 may identify each possible beam pointing angle that may be used by phased antenna array 50. Control circuitry 14 may store or identify phase and magnitude settings for phase and magnitude controllers 58 to use in implementing each of those beam pointing angles (e.g., control circuitry 14 or codebook 54 may include information that maps each beam pointing angle for phased antenna array 50 to a corresponding set of phase and magnitude values for phase and magnitude controllers 58). Codebook 54 may be hard-coded or soft-coded into control circuitry 14 or elsewhere in device 10, may include one or more databases stored at control circuitry 14 or elsewhere in device 10 (e.g., codebook 54 may be stored as software code), may include one or more look-up-tables at control circuitry 14 or elsewhere in device 10, and/or may include any other desired data structures stored in hardware and/or software on device 10. In one suitable arrangement that is described herein as an example, codebook 54 may include a beam table that identifies each beam pointing angle formable using phased antenna array 50 and the corresponding phase and magnitude settings for each phase and magnitude controller 58 to form beams at those beam pointing angles. Codebook 54 may be generated during calibration of device 10 (e.g., during design, manufacturing, and/or testing of device 10 prior to device 10 being received by an end user) and/or may be dynamically updated over time (e.g., after device 10 has been used by an end user).

Control circuitry 14 may generate control signals Y based on codebook 54. For example, control circuitry 14 may identify an optimal signal beam that would exhibit optimal wireless performance in communicating with external wireless equipment. Control circuitry 14 may subsequently identify the signal beam in codebook 54 that is oriented closest to this optimal signal beam. Control circuitry 14 may use codebook 54 to generate phase and magnitude values for phase and magnitude controllers 58. Control circuitry 14 may transmit control signals Y identifying these phase and magnitude values to phase and magnitude controllers 58 over control paths 56.

In examples where the antennas 30 in phased antenna array 50 convey radio-frequency signals with multiple polarizations (e.g., horizontal and vertical polarizations as shown in FIG. 2), phased antenna array 50 may generate respective signal beams for each polarization. For example, codebook 54 may store phases and magnitudes for use in generating signal beams of a first polarization and may store phases and magnitudes for use in generating signal beams of a second polarization. FIG. 4 is a diagram showing how codebook 54 may store phase and magnitude information for generating signal beams of different polarizations.

As shown in FIG. 4, codebook 54 may include a first set of phase and magnitude settings 60 for generating signal beams of a first polarization and may include a second set of phase and magnitude settings 62 for generating signal beams of a second polarization. Examples in which the first polarization is a first linear polarization such as a vertical (V) polarization and the second polarization is a second linear polarization orthogonal to the first linear polarization such as a horizontal (H) polarization are described herein as an example. This is merely illustrative and, in general, the vertical polarization and horizontal polarizations as described herein may be replaced by any desired polarizations (e.g., orthogonal polarizations).

The rows of phase and magnitude settings 60 each include phase and magnitude settings for a respective one of the M antennas 30 in phased antenna array 50. The columns of phase and magnitude settings 60 each include phase and magnitude settings for a respective one of the vertically polarized signal beams formable using phased antenna array 50. The vertically polarized signal beams may sometimes be referred to herein as vertically polarized signal beams $BEAM_V$ or simply as vertical signal beams $BEAM_V$. Each cell of phase and magnitude settings 60 includes a respective phase value $\phi$ and magnitude (amplitude) value $\alpha$ to be applied by the phase and magnitude controller 58 (FIG. 3) in using the corresponding antenna 30 to convey radio-frequency signals within the corresponding vertically polarized signal beam $BEAM_V$. As shown in FIG. 4, each vertically polarized signal beam $BEAM_V$ may be labeled by an index j and there may be N1 total vertically polarized signal beams $BEAM_V$ formable by phased antenna array 50. Each of the N1 vertically polarized signal beams $BEAM_V$ may be oriented in a different respective beam pointing direction (e.g., an angle/orientation of peak signal gain). Control circuitry 14 may control phased antenna array 50 to convey radio-frequency signals within one of the vertically polarized signal beams $BEAM_V$ by providing control signals Y to phase and magnitude controllers 58 (FIG. 3) that identify the phase values and amplitude values given by the corresponding column of phase and magnitude settings 60.

Similarly, the rows of phase and magnitude settings 62 each include phase and magnitude settings for a respective one of the M antennas 30 in phased antenna array 50. The columns of phase and magnitude settings 62 each include phase and magnitude settings for a respective one of the horizontally polarized signal beams formable using phased antenna array 50. The horizontally polarized signal beams may sometimes be referred to herein as horizontally polarized signal beams $BEAM_H$ or simply as horizontal signal beams $BEAM_H$. Each cell of phase and magnitude settings 62 includes a respective phase value $\phi$ and magnitude (amplitude) value $\alpha$ to be applied by the phase and magnitude controller 58 (FIG. 3) in using the corresponding antenna 30 to convey radio-frequency signals within the corresponding horizontally polarized signal beam $BEAM_H$. As shown in FIG. 4, each horizontally polarized signal beam $BEAM_H$ may be labeled by an index k and there may be N2 total horizontally polarized signal beams $BEAM_H$ formable by phased antenna array 50. Each of the N2 horizontally polarized signal beams $BEAM_H$ may be oriented in a different respective beam pointing direction. Control circuitry 14 may control phased antenna array 50 to convey radio-frequency signals within one of the horizontally polarized signal beams $BEAM_H$ by providing control signals Y to phase and magnitude controllers 58 (FIG. 3) that identify the phase values and amplitude values given by the corresponding column of phase and magnitude settings 62.

To maximize the communications throughput for wireless circuitry 24 (FIG. 1), phased antenna array 50 may concurrently convey at least first and second streams of wireless data. Phased antenna array 50 may convey the first stream of wireless data using a first polarization and may concurrently convey the second stream of wireless data using a second polarization. Phased antenna array 50 may concurrently form multiple signal beams of different polarizations for conveying each stream of wireless data. For example, phased antenna array 50 may convey the first stream of wireless data using a given vertically polarized signal beam $BEAM_V$ and may concurrently convey the second stream of wireless data using a given horizontally polarized signal beam $BEAM_H$.

Figure 5:
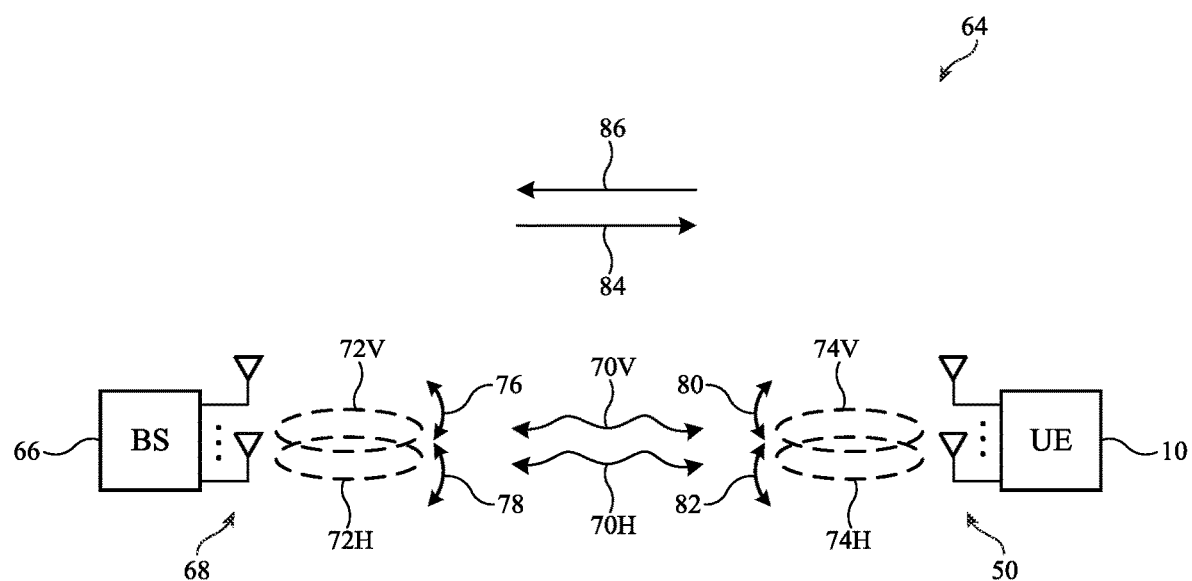
FIG. 5 is a diagram of an illustrative communications network having a user equipment device and a wireless base station that concurrently communicate using a vertically polarized signal beam and a horizontally polarized signal beam in accordance with some embodiments.

FIG. 5 is a diagram showing how device 10 may convey multiple streams of wireless data using concurrently-formed vertically polarized and horizontally polarized signal beams. As shown in FIG. 5, device 10 may communicate within a communications system 64 (sometimes referred to herein as communications network 64). Communications system 64 may include network nodes (e.g., communications terminals). The network nodes may include user equipment (UE) such as device 10. The network nodes may also include external communications equipment (e.g., communications equipment other than UE devices) such as external communications equipment 66. External communications equipment 66 may include a wireless base station (BS) or a wireless access point, for example. If desired, device 10 may wirelessly communicate with external communications equipment 66 without passing communications through any other intervening network nodes in communications system 64 (e.g., device 10 may communicate directly with external communications equipment 66 over-the-air).

Communications system 64 may form a part of a larger communications network that includes network nodes coupled to external communications equipment 66 via wired and/or wireless links. The larger communications network may include one or more wired communications links (e.g., communications links formed using cabling such as ethernet cables, radio-frequency cables such as coaxial cables or other transmission lines, optical fibers or other optical cables, etc.), one or more wireless communications links (e.g., short range wireless communications links that operate over a range of inches, feet, or tens of feet, medium range wireless communications links that operate over a range of hundreds of feet, thousands of feet, miles, or tens of miles, and/or long range wireless communications links that operate over a range of hundreds or thousands of miles, etc.), communications gateways, wireless access points, base stations, switches, routers, servers, modems, repeaters, telephone lines, network cards, line cards, portals, user equipment (e.g., computing devices, mobile devices, etc.), etc. The larger communications network may include communications (network) nodes or terminals coupled together using these components or other components (e.g., some or all of a mesh network, relay network, ring network, local area network, wireless local area network, personal area network, cloud network, star network, tree network, or networks of communications nodes having other network topologies), the Internet, combinations of these, etc. Device 10 may send data to and/or may receive data from other nodes or terminals in the larger communications network via external communications equipment 66 (e.g., external communications equipment 66 may serve as an interface between device 10 and the rest of the larger communications network). Some or all of the communications network may, if desired, be operated by a corresponding network operator or service provider.

External communications equipment 66 may include one or more antennas that provides wireless coverage for UE devices located within a corresponding geographic area or cell. The antennas may be arranged into one or more phased antenna arrays 68 (e.g., phased antenna arrays such as phased antenna array 50 of FIG. 3). Device 10 may communicate with external communications equipment 66 over a wireless link. To support the wireless link, external communications equipment 66 may transmit radio-frequency signals in a downlink (DL) direction 84 from external communications equipment 66 to device 10 and/or device 10 may transmit radio-frequency signals in an uplink (UL) direction 86 from the device 10 to external communications equipment 66.

Device 10 and external communications equipment 66 may convey a first stream of wireless data (e.g., in uplink direction 86 and/or downlink direction 84) using vertically polarized radio-frequency signals 70V and may concurrently convey a second stream of wireless data (e.g., in uplink direction 86 and/or downlink direction 84) using horizontally polarized radio-frequency signals 70H. To support vertically polarized radio-frequency signals 70V, device 10 may form a vertically polarized signal beam 74V (e.g., a vertically polarized signal beam $BEAM_V$ formed using a corresponding column of phase and magnitude settings 60 of FIG. 4) and external communications equipment 66 may form a vertically polarized signal beam 72V. To support horizontally polarized radio-frequency signals 70H, device 10 may form a horizontally polarized signal beam 74H (e.g., a horizontally polarized signal beam $BEAM_H$ formed using a corresponding column of phase and magnitude settings 62 of FIG. 4) and external communications equipment 66 may form a horizontally polarized signal beam 72H. The same antennas 30 in phased antenna array 50 may cover both polarizations (e.g., as shown in FIG. 2) or phased antenna array 50 may include a first set of antennas 30 that cover the horizontal polarization and a second set of antennas 30 that cover the vertical polarization. If desired, device 10 may include different phased antenna arrays 50 for covering the horizontal and vertical polarizations, respectively.

Communications system 64 may perform a beam selection algorithm to identify the vertically polarized signal beams 72V and 74V to be used in conveying vertically polarized radio-frequency signals 70V and to identify the horizontally polarized signal beams 7211 and 74H to be used in conveying horizontally polarized radio-frequency signals 70H. The beam selection algorithm generally involves external communications equipment 66 sweeping over different vertically polarized signal beams 72V (as shown by arrow 76), external communications equipment 66 sweeping over different horizontally polarized signal beams 72H (as shown by arrow 78), device 10 sweeping over different vertically polarized signal beams 74V (as shown by arrow 80), and device 10 sweeping over different vertically polarized signal beams 74H (as shown by arrow 82) until optimal vertically polarized signal beams and optimal horizontally polarized signal beams are found.

In some scenarios, device 10 performs beam selection by measuring reference signal received power (RSRP) values from the radio-frequency signals transmitted by external communications equipment 66 for each vertically polarized signal beam 74V and for each horizontally polarized signal beam 74H, and then selecting the vertically polarized signal beam 74V having the highest measured RSRP and selecting the horizontally polarized signal beam 74H having the highest measured RSRP for subsequent communications. However, simply selecting signal beams that exhibit the highest RSRP does not account for polarization imbalance that may be present between the vertical and horizontal polarizations. In an ideal case, the wireless performance of device 10 is the same for both horizontal and vertical polarizations. Polarization imbalance occurs when the wireless performance of device 10 for one polarization differs from the wireless performance of device 10 for another polarization. If care is not taken, polarization imbalance between the vertical and horizontal polarizations can limit the overall data throughput of wireless communications between device 10 and external communications equipment 66.

Figure 6:
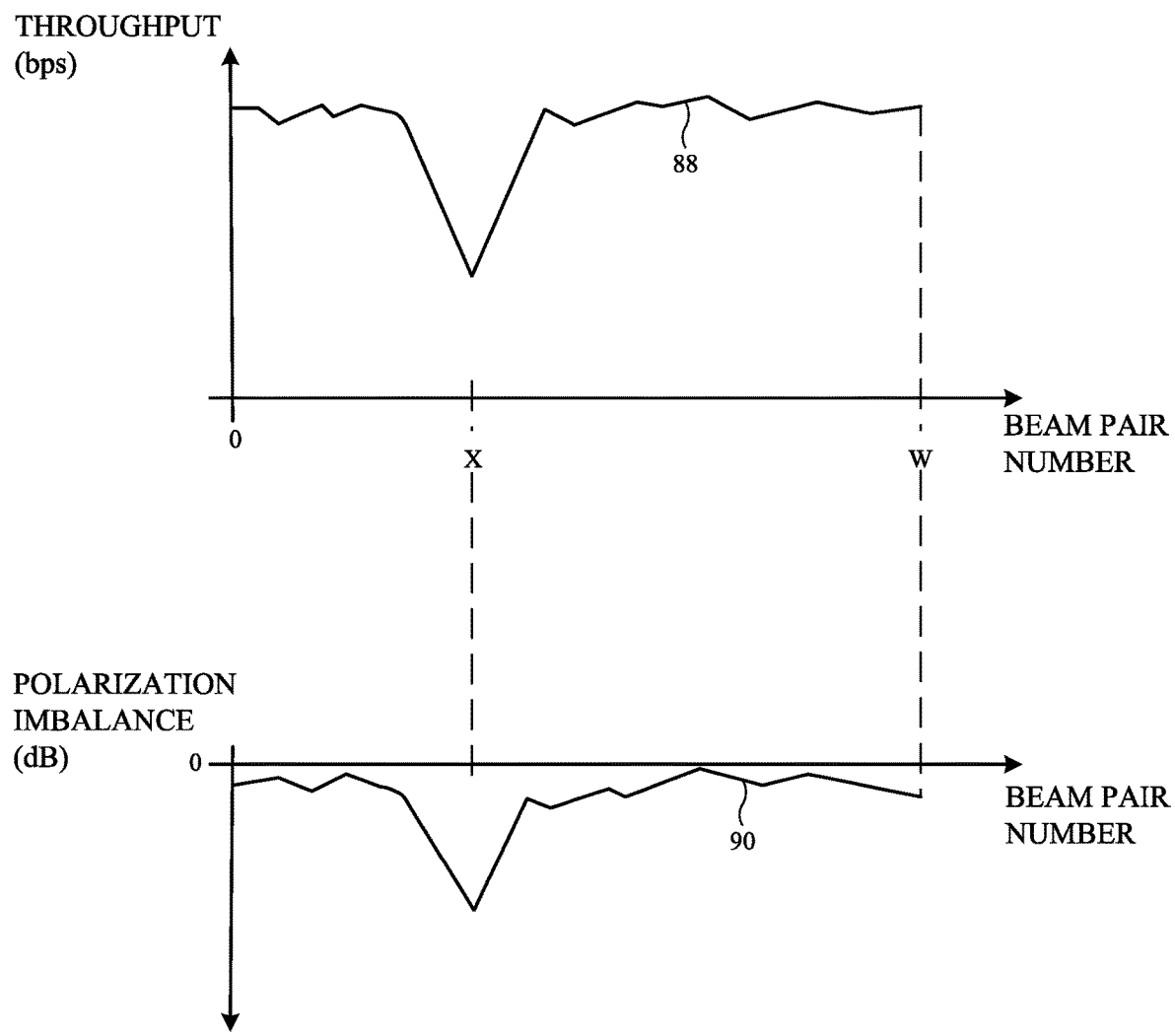
FIG. 6 is a plot showing how polarization imbalance between horizontally polarized and vertically polarized signal beams can limit throughput in accordance with some embodiments.

FIG. 6 includes plots illustrating the potential impact of polarization imbalance on data throughput. Curve 90 of FIG. 6 plots polarization imbalance (in dB) for different combinations of vertically polarized signal beam 74V and horizontally polarized signal beam 74H. Each combination of vertically polarized signal beam 74V and horizontally polarized signal beam 74H may sometimes be referred to herein as a (signal) beam pair. Each beam pair may be identified or indexed by a corresponding beam pair number (e.g., a first beam pair that includes a first vertically polarized signal beam oriented in a first beam pointing direction and a first horizontally polarized signal beam oriented in the first beam pointing direction, a second beam pair that includes the first vertically polarized signal beam oriented in the first beam pointing direction and a second horizontally polarized signal beam oriented in a second beam pointing direction, a third beam pair that includes a second vertically polarized signal beam oriented in a third beam pointing direction and a third horizontally polarized signal beam oriented in a fourth beam pointing direction, etc.).

As shown by curve 90, some beam pairs may exhibit more polarization imbalance than other beam pairs. For example, device 10 may exhibit significant polarization imbalance for beam pair number X. Beam pair number X may, for example, include a horizontally polarized signal beam that exhibits substantially different wireless performance (e.g., RSRP) than the corresponding vertically polarized signal beam. Such imbalance may be produced by the relative orientation of device 10 and external communications equipment 66, multi-path effects, differences in the radio-frequency components of device 10 and/or external communications equipment 66, and/or other factors, as examples.

Curve 88 of FIG. 6 plots throughput for each of the beam pairs (in bps). As shown by curve 88, the polarization imbalance for beam pair number X may produce a reduction in the overall throughput achievable by device 10 in communicating with external communications equipment 66. Even if the vertically polarized signal beam in beam pair number X exhibits the highest RSRP of all the vertically polarized signal beams of device 10 and if the horizontally polarized signal beam in beam pair number X exhibits the highest RSRP of all the horizontally polarized signal beams of device 10, using the horizontally polarized and vertically polarized signal beams of beam pair number X may still exhibit less overall throughput than other beam pairs due to the polarization imbalance between the horizontally polarized and vertically polarized signal beams.

Figure 7:
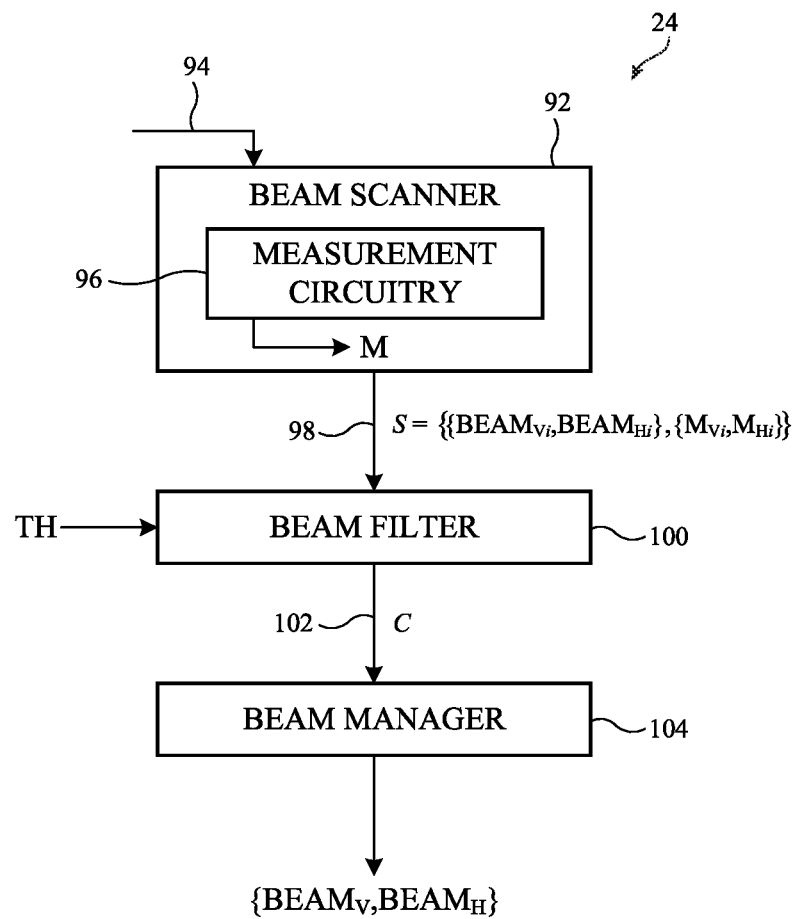
FIG. 7 is a diagram of illustrative wireless circuitry that maximizes throughput by selecting horizontally polarized and vertically polarized signal beams based on polarization imbalance between the signal beams in accordance with some embodiments.

To mitigate these issues and maximize throughput for device 10 while communicating with external communications equipment 66, device 10 may select horizontally polarized and vertically polarized signal beams based at least in part on the polarization imbalance between the signal beams. For example, as shown in FIG. 7, wireless circuitry 24 may include signal beam selection circuitry such as beam scanner 92, beam filter 100, and beam manager 104. Beam scanner 92, beam filter 100, and beam manager 104 may be implemented using hardware (e.g., digital and/or analog logic gates, look up tables, etc.) and/or using software (e.g., one or more processors on device 10 such as control circuitry 14 of FIG. 1 may perform the operations of beam scanner 92, beam filter 100, and/or beam manager 104).

The output of beam scanner 92 may be coupled to the input of beam filter 100 over control path 98. The output of beam filter 100 may be coupled to the input of beam manager 104 via control path 102. The output of beam manager 104 may be coupled to codebook 54 (FIG. 3), other control circuitry in device 10, or the control input of phase and magnitude controllers 58 (FIG. 3). Beam scanner 92 may sometimes be referred to herein as beam scanning engine 92 or beam scanning circuitry 92. Beam filter 100 may sometimes be referred to herein as beam filter circuitry 100 or beam filtering engine 100. Beam manager 104 may sometimes be referred to herein as beam management engine 104 or beam management circuitry 104.

Beam scanner 92 may include measurement circuitry 96. Measurement circuitry 96 may, if desired, be implemented on receiver 34 of FIG. 1. Measurement circuitry 96 may gather, generate, or measure wireless performance metric values (data) M from radio-frequency signals received using phased antenna array 50 (FIG. 5). Wireless performance metric values M may include RSRP values, receive signal strength indicator (RSSI) values, channel quality indicator (CQI) values, signal-to-interference-plus-noise ratio (SINR) values, signal-to-noise ratio (SNR) values, reference signal received quality (RSRQ) values, received signal power levels, received signal quality metrics, other wireless performance metric values associated with the performance of receiver 34 in receiving radio-frequency signals, and/or any other desired wireless performance metrics associated with the radio-frequency performance of device 10. Wireless performance metric values M may include wireless performance metric values $M_V$ associated with the wireless performance of device 10 in conveying vertically polarized radio-frequency signals 70V (FIG. 5) and may include wireless performance metric values $M_H$ associated with the wireless performance of device 10 in conveying horizontally polarized radio-frequency signals 70H (FIG. 5).

Beam scanner 92 may scan (sweep) phased antenna array 50 over different horizontally polarized signal beams 74H while gathering wireless performance metric values $M_H$ for each of the horizontally polarized signal beams (e.g., from received downlink signals such as reference or synchronization signals that are periodically transmitted by external communications equipment 66 of FIG. 5). Beam scanner 92 may also scan (sweep) phased antenna array 50 over different vertically polarized signal beams 74V while gathering wireless performance metric values $M_H$ for each of the horizontally polarized signal beams (e.g., from received downlink signals such as reference signals transmitted by external communications equipment 66 of FIG. 5). If desired, beam scanner 92 may scan over horizontally polarized signal beams 74H and vertically polarized signal beams 74V according to a beam scanning algorithm identified by control input 94. The beam scanning algorithm may, for example, be determined by the communications protocol governing wireless communications between device 10 and external communications equipment 66 (e.g., a 3GPP 5G NR communications protocol). Beam scanner 92 may scan over all possible (formable) horizontally polarized signal beams 74H and all possible (formable) vertically polarized signal beams 74V or over a subset of the formable signal beams. As an example, the beam scanning algorithm identified by control input 94 may instruct beam scanner 92 to scan over only a subset of the formable signal beams (e.g., signal beams that are pointed in the direction of external communications equipment 66, etc.).

While performing beam scanning, beam scanner 92 may generate, compile, identify, or produce a signal beam set S. The elements of signal beam set S may be labeled by index i (e.g., each element may include a tuple or other data structure). Each element of signal beam set S may include a respective signal beam pair. The signal beam pair includes a vertically polarized signal beam (e.g., vertically polarized signal beam 74V of FIG. 5) labeled by vertical signal beam identifier $BEAM_{Vi}$ and a horizontally polarized signal beam (e.g., horizontally polarized signal beam 74H of FIG. 5) labeled by horizontal signal beam identifier $BEAM_{Hi}$. Each element of signal beam set S may also include the wireless performance metric value $M_{Vi}$ gathered by measurement circuitry 96 using the corresponding vertically polarized signal beam of that element (e.g., as identified by vertical signal beam identifier $BEAM_{Vi}$), and may include the wireless performance metric value $M_{Hi}$ gathered by measurement circuitry 96 using the corresponding horizontally polarized signal beam of that element (e.g., as identified by horizontal signal beam identifier $BEAM_{Hi}$). In other words, signal beam set S may map horizontally polarized signal beams to the corresponding measured wireless performance metric values $M_H$ and may map vertically polarized signal beams to the corresponding measured wireless performance metric values $M_V$. Beam scanner 92 may transmit signal beam set S to beam filter 100 via control path 98.

Beam filter 100 may filter signal beam set S based on a threshold value such as threshold value TH to produce signal beam subset C (e.g., an additional/filtered set of signal beams having elements selected from the elements of signal beam set S). Signal beam subset C may include elements with horizontally polarized and vertically polarized signal beams that exhibit at least a satisfactory level or wireless performance (e.g., as determined by threshold value TH).

For example, beam filter 100 may identify a maximum wireless performance metric value $M_{MAX}$ of the wireless performance metric values $M_{Vi}$ and $M_{Hi}$ in signal beam set S (e.g., the wireless performance metric value from the elements of signal beam set S having the highest magnitude). Beam filter 100 may generate signal beam subset C by removing elements from signal beam set S where the difference between the greater of wireless performance metric values $M_{Vi}$ and $M_{Hi}$ for that element and maximum wireless performance metric value $M_{MAX}$ is greater than or equal to (exceeds) threshold value TH (e.g., by removing the worst-performing signal beam pairs from signal beam set S). Put differently, beam filter 100 may include in signal beam subset C only those elements of signal beam set S where the difference between the greater of wireless performance metric values $M_{Vi}$ and $M_{Hi}$ and maximum wireless performance metric value $M_{MAX}$ is less than threshold value TH (e.g., by including only the best-performing signal beam pairs from signal beam set S in signal beam subset C). Threshold value TH may be configurable/adjustable. Threshold value TH may be 5 dBm, 1-10 dBm, 10 dBm, 2-8 dBm, 1-6 dBm, 1-5 dBm, 8 dBm, or other values, as examples.

Consider an example where wireless performance metric values M include RSRP values. In this example, beam filter 100 may identify the maximum RSRP value $RSRP_{MAX}$ gathered by measurement circuitry 96 across signal beam set S. The ith element of signal beam set S may include an RSRP value $RSRP_{Vi}$ as its wireless performance metric value $M_{Vi}$ and may include an RSRP value $RSRP_{Hi}$ as its wireless performance metric value $M_{Hi}$. The greater of RSRP value $RSRP_{Hi}$ and RSRP value $RSRP_{Vi}$ may be denoted simply as $RSRP_i$ to characterize the performance of the signal beam pair. Beam filter 100 may include the ith element of signal beam set S in signal beam subset C if $RSRP_{MAX} - RSRP_i < TH$. In this way, beam filter 100 may generate signal beam subset C to include only the best-performing signal beams from signal beam set S (e.g., signal beam pairs that will produce at least a satisfactory level of wireless performance).

Beam filter 100 may transmit signal beam subset C to beam manager 104 over control path 102. Beam manager 102 may identify, calculate, compute, or generate the polarization imbalance between the signal beams in each signal beam pair of signal beam subset C (e.g., beam manager 102 may identify, calculate, compute, or generate a polarization imbalance value IMB for each element of signal beam subset C). The polarization imbalance for each element of signal beam subset C (e.g., for each signal beam pair identified by signal beam subset C) may be defined by the absolute value of the difference between the wireless performance metric value $M_{Vi}$ and the wireless performance metric value $M_{Hi}$ of that element of signal beam subset C. For example, when wireless performance metric values M include RSRP, the polarization imbalance IMB of the ith element of signal beam subset C may be given by the equation $IMB = |RSRP_{Hi} - RSRP_{Vi}|$.

Beam manager 102 may then select the signal beam pair of signal beam subset C having the smallest of the polarization imbalances to serve as the signal beams used for subsequent communications (e.g., as vertically polarized signal beam $BEAM_V$ and horizontally polarized signal beam $BEAM_H$). For example, beam manager 102 may identify the element of signal beam subset C having the minimum polarization imbalance IMB of all the elements of signal beam subset C. Beam manager 102 may control phased antenna array 50 (e.g., using codebook 54 of FIG. 4) to perform subsequent communications using the vertically polarized signal beam $BEAM_V$ given by the vertical beam identifier $BEAM_{Vi}$ of the identified element of signal beam subset C and may control phased antenna array 50 (e.g., using codebook 54 of FIG. 4) to perform subsequent communications using the horizontally polarized signal beam $BEAM_H$ given by the horizontal beam identifier $BEAM_{Hi}$ of the identified element of signal beam subset C.

The selected vertically polarized signal beam $BEAM_V$ (e.g., vertically polarized signal beam 74V of FIG. 5) and the selected horizontally polarized signal beam $BEAM_H$ (e.g., horizontally polarized signal beam 74H of FIG. 5) may allow device 10 to communicate with greater throughput than in scenarios where device 10 simply uses the vertically polarized signal beam that exhibits the highest RSRP value and the horizontally polarized signal beam that exhibits the highest RSRP value (e.g., because the selected signal beams minimize polarization imbalance). While the vertically polarized signal beam $BEAM_V$ may not have the highest wireless performance metric value $M_V$ and/or the horizontally polarized signal beam $BEAM_H$ may not have the highest wireless performance metric value $M_H$ across signal beam set S, device 10 may maximize throughput in communicating with external communications equipment 66 by accounting for and minimizing polarization imbalance in this way.

Consider an example in which the $31^{st}$ vertically polarized signal beam (e.g., j=31 in codebook 54 of FIG. 4) exhibits the highest RSRP of all the vertically polarized signal beams and the $159^{th}$ horizontally polarized signal beam (e.g., k=159 in codebook 54 of FIG. 4) exhibits the highest RSRP of all the horizontally polarized signal beams. In this example, the $31^{st}$ vertically polarized signal beam may exhibit an RSRP of −97.58 dBm whereas the $159^{th}$ horizontally polarized signal beam exhibits an RSRP of −86.94 dBm. While these RSRP values may be the best performing RSRP values gathered, there is a relatively large polarization imbalance between the vertically polarized and horizontally polarized signal beams (e.g., a polarization imbalance of 10.6 dBm). Performing concurrent communications using parallel wireless data streams over these two signal beams may produce a limited overall throughput such as a throughput of 1.34 Gbps.

On the other hand, beam scanner 92, beam filter 100, and beam manager 104 of FIG. 7 may identify that the $35^{th}$ vertically polarized signal beam (e.g., j=35 in codebook 54 of FIG. 4) and the $163^{rd}$ horizontally polarized signal beam (e.g., k=163 in codebook 54 of FIG. 4) exhibits the least polarization imbalance of all the signal beam pairs in signal beam subset C, for example. In this example, the $35^{th}$ vertically polarized signal beam may exhibit an RSRP of −90.78 dBm and the $163^{rd}$ horizontally polarized signal beam may exhibit an RSRP of −88.53 dBm. While the $35^{th}$ vertically polarized signal beam exhibits an RSRP that is around 7 dBm worse than the $31^{st}$ vertically polarized signal beam in this example, there is a relatively small polarization between the vertically polarized and the horizontally polarized signal beams (e.g., a polarization imbalance of 2.25 dBm). This reduction in polarization imbalance may allow device 10 to perform concurrent communications using parallel wireless data streams over the $35^{th}$ vertically polarized signal beam and the $163^{rd}$ horizontally polarized signal beam that is much higher than the throughput achievable using the $31^{st}$ vertically polarized signal beam and the $159^{th}$ horizontally polarized signal beam (e.g., by as much as 500 Mbps or greater). In other words, sacrificing some RSRP on one or both the signal beams to instead minimize polarization imbalance between the signal beams may serve to maximize throughput for device 10 relative to examples where the phased antenna array is forced to communicate simply using the signal beams having the highest RSRP.

Figure 8:
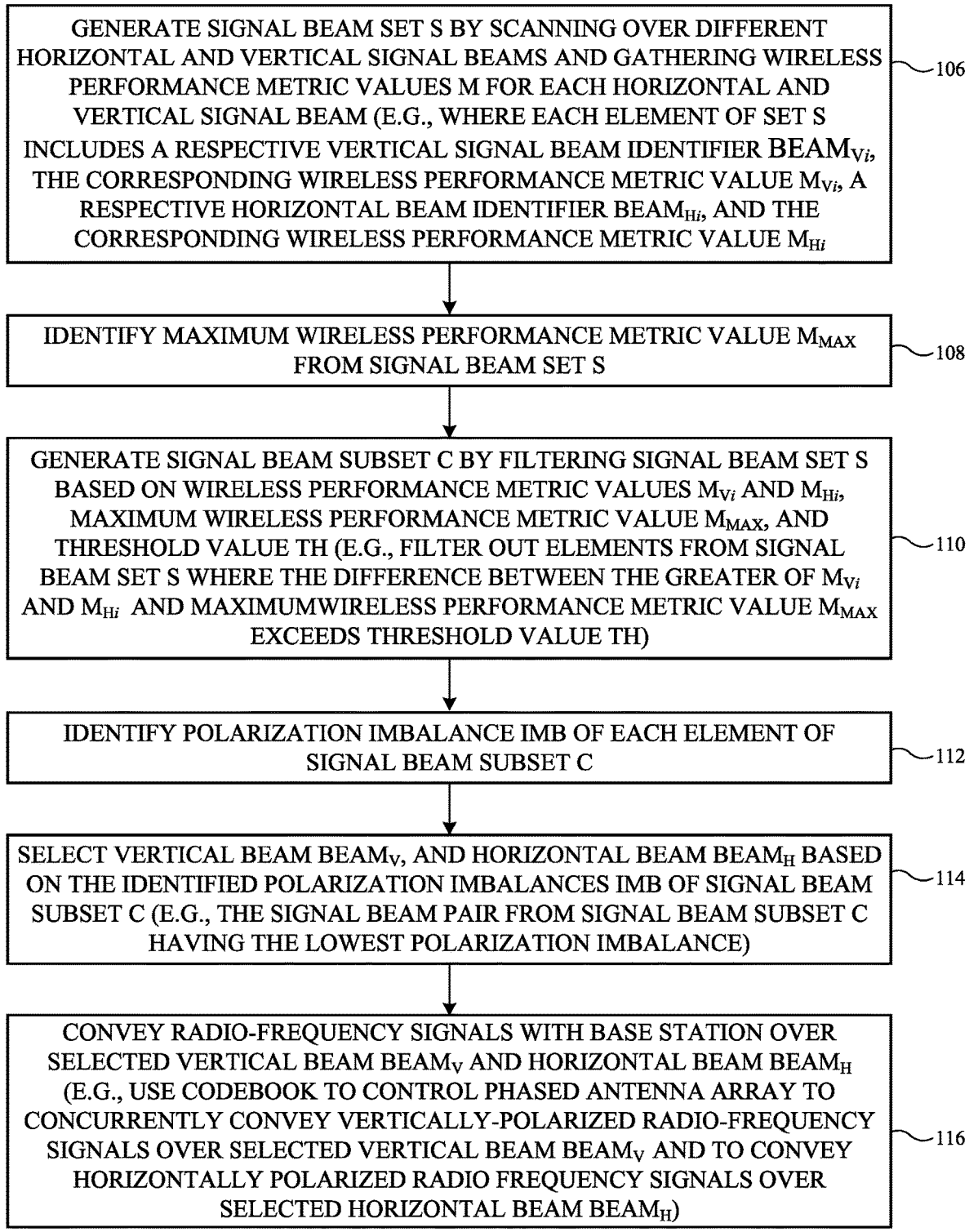
FIG. 8 is a flow chart of illustrative operations that may be performed by wireless circuitry to select horizontally polarized and vertically polarized signal beams based on polarization imbalance in accordance with some embodiments.

FIG. 8 is a flow chart of illustrative operations involved in maximizing throughput for wireless circuitry 24 by selecting vertically polarized and horizontally polarized signal beams based on polarization imbalance.

At operation 106, beam scanner 92 may generate signal beam set S by scanning over different horizontally polarized signal beams 74H (FIG. 5) and vertically polarized signal beams 74V. Beam scanner 92 may choose signal beams to scan over based on control input 94 if desired. Measurement circuitry 96 may generate wireless performance metric values M for each of the scanned signal beams (e.g., by measuring received signals from external communications equipment 66 such as synchronization signals or reference signals). The ith element of signal beam set S may include a wireless performance metric value $M_{Hi}$, a horizontal signal beam identifier $BEAM_{Hi}$ that identifies the horizontally polarized signal beam 74H that was used to gather the wireless performance metric value $M_{Hi}$, a wireless performance metric value $M_{Vi}$, and a vertical signal beam identifier $BEAM_{Vi}$ that identifies the vertically polarized signal beam 74V that was used to gather the wireless performance metric $BEAM_{Vi}$. Beam scanner 92 may output signal beam set S for filtering by beam filter 100.

At operation 108, beam filter 100 may identify the maximum wireless performance metric value $M_{MAX}$ from signal beam set S. Maximum wireless performance metric value $M_{MAX}$ may be the wireless performance metric value $M_{Hi}$ or $M_{Vi}$ having the greatest absolute value (magnitude) across the elements of signal beam set S.

At operation 110, beam filter 100 may generate signal beam subset C by filtering signal beam set S based on wireless performance metric values $M_{Hi}$ and $M_{Vi}$, maximum wireless performance metric value $M_{MAX}$, and threshold value TH. For example, beam filter 100 may generate signal beam subset C by filtering out elements from signal beam set S where the difference between the greater of wireless performance metric values $M_{Hi}$ and $M_{Vi}$ and maximum wireless performance metric value $M_{MAX}$ is greater than or equal to threshold value TH. Put differently, beam filter 100 may include in signal beam subset C those elements of signal beam set S where the difference between the greater of wireless performance metric values and $M_{Vi}$ and maximum wireless performance metric value $M_{MAX}$ is less than threshold value TH. Beam filter 100 may output signal beam subset C to beam manager 104 for further processing.

At operation 112, beam manager 104 may identify the polarization imbalance for each element of signal beam subset C. For example, beam manager 104 may generate a polarization imbalance value IMB for each element of signal beam subset C (e.g., for each signal beam pair in signal beam subset C) by computing the absolute value of the difference between the wireless performance metric values $M_{Hi}$ and $M_{Vi}$ for that element of signal beam subset C.

At operation 114, beam manager 104 may select a signal beam pair from signal beam subset C to use for subsequent communications based on the polarization imbalance of each of the signal beam pairs in signal beam subset C. For example, beam manager 104 may select the signal beam pair or element of signal beam subset C having the minimum (smallest) polarization imbalance to use for subsequent communications (e.g., beam manager 104 may select the vertically polarized signal beam BEAM$_V$ identified by the vertical signal beam identifier BEAM$_{V_i}$ of the element of signal beam subset C having the minimum polarization imbalance and may select the horizontally polarized signal beam BEAM$_H$ identified by the horizontal signal beam identifier BEAM$_{H_i}$ of the element of signal bema subset C having the minimum polarization imbalance for use during subsequent communications). This is merely illustrative and, as another example, beam manager 104 may select a signal beam pair that is within a threshold margin of the minimum polarization imbalance to use for subsequent communications.

At operation 116, beam manager 104 may control phased antenna array 50 to convey a first stream of wireless data using vertically polarized radio-frequency signals 70V (FIG. 5) and the vertical signal beam BEAM$_V$ identified by the selected signal beam pair. Beam manager 104 may control phased antenna array 50 to concurrently (e.g., simultaneously) convey a second stream of wireless data using horizontally polarized radio-frequency signals 70H (FIG. 5) and the horizontal signal beam BEAM$_H$ identified by the selected signal beam pair. The selected signal beams BEAM$_V$ and BEAM$_H$ may minimize polarization imbalance and thereby maximize throughput for data communications between external communications equipment 66 and device 10. While horizontal and vertical polarizations are described herein as an example, the horizontal polarization as described herein may be replaced by any desired first electromagnetic polarization and the vertical polarization as described herein may be replaced by any desired second electromagnetic polarization (e.g., orthogonal to the first electromagnetic polarization).

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-8 (e.g., the operations of FIG. 8) may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry 18 of FIG. 1, etc.). The processing circuitry may include microprocessors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. An electronic device configured to communicate with a wireless base station, the electronic device comprising:
   antennas configured to receive downlink signals from the wireless base station using a first polarization and a second polarization orthogonal to the first polarization; and
   one or more processors configured to
      select a first signal beam of the first polarization and a second signal beam of the second polarization based on a polarization imbalance between the first polarization and the second polarization in the downlink signals received from the wireless base station, and
      use the antennas to convey a first stream of wireless data over the first signal beam while concurrently conveying a second stream of wireless data over the second signal beam.

2. The electronic device of claim 1, the one or more processors being further configured to:
   sweep the antennas over a set of signal beam pairs while receiving the downlink signals, each signal beam pair in the set of signal beam pairs comprising a respective combination of signal beams of the first and second polarizations.

3. The electronic device of claim 2, wherein the first signal beam and the second signal beam form a signal beam pair from the set of signal beam pairs having a smallest polarization imbalance of the set of signal beam pairs.

4. The electronic device of claim 2, the one or more processors being further configured to:
   measure wireless performance metric values for each of the signal beam pairs in the set of signal beam pairs; and
   select the first and second signal beams based at least in part on the wireless performance metric values.

5. The electronic device of claim 4, the one or more processors being further configured to:
   generate a filtered set of signal beam pairs by filtering the set of signal beam pairs based at least in part on the wireless performance metric values, wherein the first signal beam and the second signal beam comprise a signal beam pair from the filtered set of signal beam pairs.

6. The electronic device of claim 5, wherein the first signal beam and the second signal beam exhibit a minimum polarization imbalance of the filtered set of signal beam pairs.

7. The electronic device of claim 6, wherein the wireless performance metric values comprise reference signal receive power (RSRP) values.

8. The electronic device of claim 1, wherein the antennas are arranged in a phased antenna array and the downlink signals are received at a frequency greater than 10 GHz.

9. The electronic device of claim 1, wherein the first polarization comprises a first linear polarization and the second polarization comprises a second linear polarization.

10. The electronic device of claim 1, wherein the downlink signals comprise synchronization signals.

11. A method of operating a user equipment device to communicate with a wireless base station, the method comprising:

with one or more phased antenna arrays, receiving downlink signals from the wireless base station using a first polarization and using a second polarization orthogonal to the first polarization;

selecting a first signal beam of the first polarization and a second signal beam of the second polarization based at least in part on a polarization imbalance between the first polarization and the second polarization in the received downlink signals; and conveying a first stream of wireless data with the wireless base station over the first signal beam while concurrently conveying a second stream of wireless data with the wireless base station over the second signal beam.

12. The method of claim 11, further comprising:

receiving the downlink signals over a set of signal beam pairs, each signal beam pair in the set of signal beam pairs comprising a respective combination of signal beams of the first and second polarizations, wherein the first signal beam and the second signal beam form a signal beam pair from the set of signal beam pairs that exhibits a minimum polarization imbalance of the set of signal beam pairs.

13. The method of claim 11, further comprising:

sweeping through a set of signal beam pairs while receiving the downlink signals, each signal beam pair including a respective combination of signal beams of the first and second polarizations; and for each signal beam pair in the set of signal beam pairs, measuring a respective wireless performance metric value for the first polarization and a respective wireless performance metric value for the second polarization.

14. The method of claim 13, further comprising:

generating a filtered set of signal beam pairs by filtering out signal beam pairs from the set of signal beam pairs having a wireless performance metric value that differs from a maximum of the wireless performance metric values by more than a threshold value.

15. The method of claim 14, further comprising:

selecting, as the first and second signal beams, a signal beam pair from the filtered set of signal beam pairs having a minimum polarization imbalance of the filtered set of signal beam pairs.

16. The method of claim 15, wherein the first signal beam has a wireless performance metric value that is lower in magnitude than the maximum of the wireless performance metric values.

17. The method of claim 16, wherein the wireless performance metric values comprise reference signal receive power (RSRP) values.

18. A method of operating an electronic device to communicate with a wireless base station, the method comprising:

with a phased antenna array, concurrently receiving downlink signals over a first signal beam of a first linear polarization and a second signal beam of a second linear polarization orthogonal to the first linear polarization;

measuring a first wireless performance metric value from the downlink signals using the first signal beam and a second wireless performance metric value from the downlink signals using the second signal beam;

with the phased antenna array, concurrently receiving the downlink signals over a third signal beam of the first linear polarization and a fourth signal beam of the second linear polarization, the third signal beam being oriented at a different angle than the first signal beam;

measuring a third wireless performance metric value from the downlink signals using the third signal beam and a fourth wireless performance metric value from the downlink signals using the fourth signal beam; and with the phased antenna array, concurrently conveying a first wireless data stream over the third signal beam and a second wireless data stream over the fourth signal beam, wherein the first wireless performance metric value differs from the second wireless performance metric value by a first amount, the third wireless performance metric value differs from the fourth wireless performance metric value by a second amount that is less than the first amount, and the first wireless performance metric value has a higher magnitude than the third wireless performance metric value and the fourth wireless performance metric value.

19. The method of claim 18, wherein the first, second, third, and fourth wireless performance metric values comprise reference signal receive power (RSRP) values.

20. The method of claim 18, wherein the downlink signals comprise synchronization signals.

* * * * *